Nov. 20, 1923. 1,474,545
T. OLSEN
TESTING MACHINE
Filed July 19, 1920 2 Sheets-Sheet 1

Fig. 1.

Inventor
Tinius Olsen.
by his Attorneys
Howson & Howson

Nov. 20, 1923.　　　　　　　　　　　　　　　1,474,545
T. OLSEN
TESTING MACHINE
Filed July 19, 1920　　　2 Sheets-Sheet 2
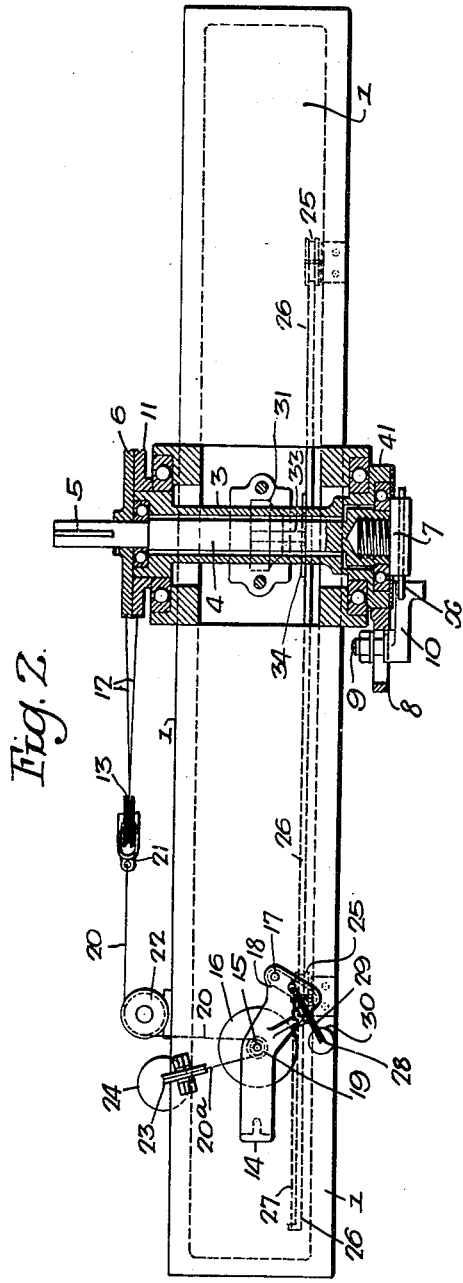
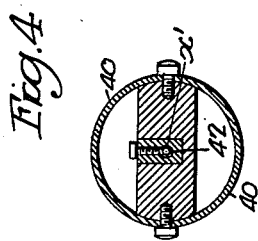
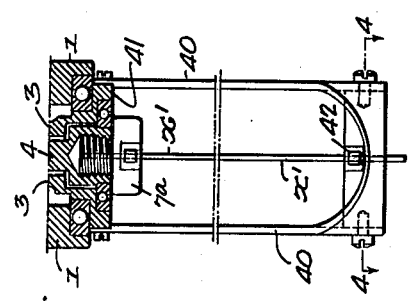
Inventor-
Tinius Olsen,
by his Attorneys,
Howson & Howson Patented Nov. 20, 1923.

1,474,545

UNITED STATES PATENT OFFICE.

TINIUS OLSEN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

TESTING MACHINE.

Application filed July 19, 1920. Serial No. 397,427.

*To all whom it may concern:*

Be it known that I, TINIUS OLSEN, a citizen of the United States, residing in Philadelphia, Pennsylvania, have invented Testing Machines, of which the following is a specification.

One object of this invention is to provide a compact and substantial machine of novel construction for subjecting a test specimen to bending or torsional stresses, which machine shall include novel means for obtaining a graphic record or indication of the stresses applied to and the resulting deformation caused in each specimen; the arrangement of parts being such as to permit of rapid and accurate operation.

These objects and other advantageous ends I attain as hereinafter set forth, reference being had to the accompanying drawings, in which, Fig. 1 is a side elevation of a machine constructed in accordance with my invention;

Fig. 2 is a plan, partly in horizontal section, taken through the center line of the coaxial spindles;

Fig. 3 is a horizontal section of a portion of my machine illustrating it as equipped with an attachment for making torsional tests; and Fig. 4 is a section on the line 4—4, Fig. 3.

In the above drawings, 1 represents a flat, elongated box-like frame supported on legs 2 and at or adjacent its middle portion provided with anti-friction bearings for the support of a tubular spindle 3. Concentrically mounted within this spindle is a second shaft 4 having one end 5 squared or otherwise formed for the attachment of an operating member actuated by hand or power. This end has fixed to it a pulley wheel 6.

The inner shaft 4 is journalled in anti-friction bearings carried by the spindle 3 and its second end which overhangs the adjacent end of said spindle, has detachably or otherwise mounted in it a chuck 7 for a test specimen $x$ in the shape of a rod or bar so held as to extend at right angles to the center line of said shaft. The adjacent end of the tubular spindle 3 carries a projecting bracket 8 in which is formed a radial slot for the reception of a clamping bolt 9, and this serves to adjustably hold to said bracket a dog 10 which projects radially toward the chuck 7 and has a head adjacent the same formed to engage the projecting end of a test specimen carried by said spindles 4. Immediately adjacent the pulley wheel 6 and keyed or otherwise fixed to the tubular spindle 3 is a second pulley wheel 11 having attached to it one end of a cord or band 12 which extends around a sheave 13 and back to said pulley wheel 6 where its second end is fastened.

Adjacent one end of the frame 1 is a standard 14 carrying bearings for a vertical spindle 15 on which is mounted a vertically extending drum 16. Adjacent this drum and also supported by the standard 14 is a pair of vertical bars 17 constituting a guide on which a pencil carriage 18 is slidable. The latter carries a pencil or other form of stylus positioned to engage and form a record on a sheet of paper mounted on the drum.

The sheave 13 is carried by a yoke 21 to which is connected one end of a cord, cable or equivalent flexible member 20 passing around a guide pulley 22 on the frame 1, and thence to a pulley 19 on the spindle 15 of the record drum where it is fastened. A second cord 20ª also fastened to the same pulley 19 passes over a pulley 23 on the frame 1, and down to a weight 24 whereby it with the cords 20 and 12 are maintained taut at all times.

The frame 1 is provided with two or any desired number of pairs of anti-friction rollers 25—25, serving as supports for an elongated, horizontally mounted bar 26, in the present instance carried within the hollow of said frame. That end of said bar adjacent the standard 14 has connected to it one end of a cord or cable 27 which passes through a groove in one of the rollers 25 up to the pencil carriage 18 to which it is attached. Another cord 28 also fixed to the carriage 18 passes up to a pulley 29 at the top of the standard 14 and down to a weight 30.

The hollow spindle 3 has clamped to its middle portion the upper end of a rod 31 having a weight 32 on its lower end forming with it a pendulum, and said bar has a laterally projecting pin or abutment 33 at all times engaged by an arm 34 projecting from the longitudinally movable bar 26;—the arrangement being such that the weight 30 through the cords 28 and 27 and said bar causes said arm to be at all times held in contact with the pin 33.

From the foregoing description it will be seen that the movement of the pencil carriage 18 on its vertical guide bars 17 is governed by the pendulum through the bar 26 while the rotation of the drum 16 with its vertical spindle 15, is dependent upon the relative movement of the two pulleys 6 and 11.

Under conditions of operation, the test specimen $x$ of wire or bar material is secured by the chuck 7 to the end of the spindle 4 so that one end projects over the head of the dog 10 on the spindle 3. If now the inner shaft or spindle 4 be turned in a counter clockwise direction by power applied to its end 5, so that the projecting end of the specimen comes into engagement with the head of the dog, the tubular spindle 3 is likewise turned in its bearings against the force imposed by the pendulum,—which is raised until its weight becomes sufficient to bend said specimen.

When such bending occurs under the stress thus imposed, the rotary movement of the spindle 3 is less than that of the inner shaft or spindle 4 and there is therefore a relative movement of the two pulleys 6 and 11. This results in a bodily movement of the sheave 13 by the cord 12 and such movement through the cord 20 results in a rotation of the drum 16. At the same time, the bar 26 is caused to move longitudinally as its arm 34 follows the movement of the pendulum from its normal position and there is a consequent vertical movement of the carriage 18. The pencil carried by the latter is thus caused to draw on the record sheet carried by the drum a line whose ordinates are proportional to the stresses applied to the test specimen and whose abscissae are proportional to the amount of bending or distortion of said specimen corresponding to said stresses.

If it be desired to utilize the above described device for testing the torsional strength of wire, rod, or bar material or the like, I so construct the inner spindle 4 as to fit it for clamping engagement with one end of a specimen $x^1$ which extends in the axial line of said spindle (Figs. 3 and 4). In such case I omit the bracket 8 and dog 9 and substitute therefor a yoke in the form of an elongated tube 40 having its arms bolted to opposite points of the head 41 of the tubular spindle 3. The outer end of said yoke carries a second clamping device 42 designed to engage the second or free end of said specimen $x^1$, which may then be subjected to a twisting stress when the shaft 4 is turned, due to the load imposed in deflecting the pendulum from its vertical position.

As before the relative movement of the pulleys 6 and 11 due to the relative movement of the two spindles occurring when the test specimen twists, causes the rotation of the drum 16 while the corresponding deflection of the pendulum likewise causes a vertical movement of the pencil carriage 18, so that the pencil makes on the drum a record indicative of the torsional stresses applied to and the corresponding distortion of the test specimen.

I claim:—

1. The combination in a testing machine of two substantially coaxial rotary members mounted one within the other; means for causing said members to cooperate to apply stress to a test specimen; with means for indicating the stress applied to the specimen and the resulting deformation of the latter.

2. The combination of two substantially coaxial rotary members adapted to have a test specimen connected to transmit motion between them and mounted one within the other; means including a pendulum mounted on the outer member for resisting movement of one of said members when a rotative force is applied to the other; and means for recording the stress applied to and the corresponding deformation of the test specimen.

3. The combination of two substantially coaxial rotary members adapted to have a test specimen connected to transmit motion between them; a pendulum connected to one of said members to resist movement thereof transmitted to the test specimen from the other member; and a device for recording the stress applied to and the resulting deformation of said specimen including a longitudinally movable rod and an arm thereon engaged by the pendulum.

4. The combination in a testing machine of a supporting frame; a tubular spindle rotatably mounted thereon; a second spindle rotatably supported within the tubular spindle; a pendulum connected to the tubular spindle; means for connecting a test specimen to said spindles to cause it to trasmit movement from one to the other; with means for indicating the stress applied to and the deformation of the test specimen when the second spindle is turned.

5. The combination in a testing machine of a supporting frame; two coaxial spindles rotatably mounted thereon; a chuck for a test specimen carried by one of the spindles; a member on the other spindle positioned to operatively engage such specimen; means for applying a progressively increasing force to resist movement of one of the spindles when the other spindle is turned; and means for recording the stresses applied to and the corresponding deformation of the test specimen.

6. The combination in a testing machine of a supporting frame; two coaxial spindles rotatably mounted thereon one within the other; a specimen holder on the inner of said spindles; a member on the outer spindle mounted to engage the test specimen carried by said holder; a pendulum connected to the outer spindle; and a recording device for indicating the stresses applied to and the deformation of the test specimen when the inner spindle is turned.

7. The combination in a testing machine of two coaxial spindles; pulley wheels respectively attached to said spindles; means for connecting a test specimen to transmit movement from one of the spindles to the other; means for opposing with progressively increasing force movement of one of the spindles when the other spindle is turned; a member connected to be bodily moved by the relative movement of the pulleys; a recording drum connected to be turned by movement of said member; and a stylus cooperating with the drum and operatively connected to one of the spindles.

8. The combination in a testing machine of two coaxial rotatably mounted spindles one within the other; a pendulum connected to one of said spindles; means for connecting a test specimen between the spindles; a stylus connected to be moved with the pendulum; and a record drum mounted to cooperate with the stylus and turned by relative movement of said two spindles.

9. The combination in a testing machine of a supporting frame; two coaxial spindles rotatably mounted thereon; means for connecting a test specimen between said spindles; a pendulum connected to one of the spindles; a longitudinally movable bar having an arm; means for maintaining said arm at all times in engagement with a portion of the pendulum; a stylus connected to be moved with said bar; and a record drum cooperating with the stylus and rotated by relative movement of the spindles.

10. The combination in a testing machine of a supporting frame; two coaxial spindles rotatably mounted thereon; means for connecting a test specimen between said spindles so that it will be subjected to torsional stress when one of said spindles is turned, the same consisting of a chuck carried by one of the spindles and a yoke carried by the other spindle; and means for recording the stresses applied to the corresponding distortion of the specimen.

11. The combination in a testing machine of a supporting frame; means thereon including two coaxial members and a pendulum for applying stress to a test specimen; a longitudinally movable bar; means for causing said bar to move with said pendulum and means actuated by said bar for recording the stress applied by the pendulum.

TINIUS OLSEN.